United States Patent
Noma et al.

(10) Patent No.: US 8,315,612 B2
(45) Date of Patent: Nov. 20, 2012

(54) TERMINAL DEVICE, COMMUNICATION PROCESSING METHOD AND PHONE-BOOK MANAGEMENT METHOD

(75) Inventors: Yasuhiro Noma, Kawasaki (JP); Mitsuhiro Okamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 209 days.

(21) Appl. No.: 12/829,999

(22) Filed: Jul. 2, 2010

(65) Prior Publication Data

US 2011/0003584 A1 Jan. 6, 2011

(30) Foreign Application Priority Data

Jul. 6, 2009 (JP) .................. 2009-160083

(51) Int. Cl.
*H04M 3/42* (2006.01)
(52) U.S. Cl. ............ 455/415; 455/418; 455/550.1
(58) Field of Classification Search ............ 455/415, 455/417, 414.1, 456.4
See application file for complete search history.

(56) References Cited

U.S. PATENT DOCUMENTS 6,584,490 B1 * 6/2003 Schuster et al. ............ 709/200
2009/0112804 A1 * 4/2009 Quiroz-Castro .............. 707/3

FOREIGN PATENT DOCUMENTS

JP 2004-356946 A 12/2004
JP 2008-104003 A 5/2008

* cited by examiner

*Primary Examiner* — Vladimir Magloire
(74) *Attorney, Agent, or Firm* — Westerman, Hattori, Daniels & Adrian, LLP

(57) ABSTRACT

A terminal device includes a deletion reason-registration unit configured to register deletion target information and deletion reason information with a storage unit storing information relating to a communication destination and a communication processing unit configured to acquire the deletion reason information registered by the deletion reason-registration unit from the storage unit upon receiving information about a communication connection request issued from a device of a communication destination corresponding to the deletion target information stored in the storage unit, and executes communication processing based on the acquired deletion reason information.

7 Claims, 15 Drawing Sheets

| No. | DELETION-DATE AND TIME | DELETION REASON |
|---|---|---|
| 2 | 2009/04/20 09:00:00 | ONETIME COLLEAGUE |
| ⋮ | ⋮ | ⋮ |

| No. | NAME | PHONE NUMBER | MAIL ADDRESS | LAST CONVERSATION-DATE AND TIME | DELETION FLAG | ... |
|---|---|---|---|---|---|---|
| 1 | ATAROH | 090-1111-1111 | Atarou@xxx.ne.jp | 2009/06/01 12:30:00 | | ... |
| 2 | BTAROH | 090-2222-2222 | Bjirou@xxx.ne.jp | 2009/02/25 09:35:00 | O | ... |
| 3 | CSABUROH | 090-3333-3333 | Csaburou@xxx.ne.jp | 2009/05/05 21:15:3 | | ... |
| ... | ... | ... | ... | ... | ... | ... |

| No. | DELETION-DATE AND TIME | DELETION REASON |
|---|---|---|
| 2 | 2009/04/20 09:00:00 | ONETIME COLLEAGUE |
| ⋮ | ⋮ | ⋮ |

INCOMING CALL FROM "BJIROH" DELETED
FROM PHONE BOOK ON 04/20/2009

DELETION REASON: ONETIME COLLEAGUE

DO YOU TAKE INCOMING CALL?

YES   NO

TERMINAL DEVICE, COMMUNICATION PROCESSING METHOD AND PHONE-BOOK MANAGEMENT METHOD

CROSS-REFERENCE TO RELATED APPLICATIONS

This application is based upon and claims the benefit of priority of the prior Japanese Patent Application No. 2009-160083, filed on Jul. 6, 2009, the entire contents of which are incorporated herein by reference.

FIELD

The present invention relates to a terminal device, a communication processing method and a phone-book management method.

BACKGROUND

Mobile phones have phone-book information including various types of information relating to a communication destination. The phone-book information includes, for example, various types of information including information about names, phone numbers, electronic mail addresses, addresses, etc.

Further, there have been services for displaying information indicating who is making an incoming call on a display unit of the mobile phone when a communication destination whose information is included in the phone-book information makes the call. Consequently, the user of the mobile phone is notified of the communication destination in advance. Further, the backup of the phone-book information used for the above-described services can be stored in not only the mobile phone, but also a server provided on a network supplied by the communication carrier of the mobile phone.

Incidentally, the phone-book information of the mobile phone includes information about many persons, as described above. Therefore, it may be considered that unnecessary information included in the phone-book information be deleted as appropriate from the point of view of security. Especially, in the case where a mobile phone specifically designed for a company is used, there has been a growing demand for deleting the entire registered personal information when a project is finished and/or a contract between companies ends.

However, when a communication destination of which information had been deleted from the phone-book information makes a call, it becomes difficult to know who is making an incoming call, as the matter of course. Further, when settings are made so that an incoming call from a communication destination of which information is not included in the phone-book information is refused, the call from the communication destination may not be received.

Recently, therefore, there has been the technology for extracting information about the communication history corresponding to a deleted phone number when a communication destination of which information had been deleted from the phone-book information of a mobile phone makes a call, and displaying data stored in a name display column of the communication history, in place of the name information corresponding to the extracted phone number. Further, there has been the technology for storing information deleted from the phone-book information, memo pad information, etc. of the mobile phone on a different storage area so that a user can confirm the information deleted from the phone-book information and/or the memo pad information. The above-described technologies are disclosed, for example, in Japanese Laid-open patent publication No. 2008-104003 and Japanese Laid-open patent publication No. 2004-356946.

SUMMARY

According to an aspect of the invention, a terminal device includes a deletion reason-registration unit configured to register deletion target information and deletion reason information with a storage unit storing information relating to a communication destination and a communication processing unit configured to acquire the deletion reason information registered by the deletion reason-registration unit from the storage unit upon receiving information about a communication connection request issued from a device of a communication destination corresponding to the deletion target information stored in the storage unit, and executes communication processing based on the acquired deletion reason information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates exemplary information included in phone-book table data;

FIG. 3 illustrates exemplary information included in phone-book deletion table data;

FIG. 4 illustrates exemplary display screen attained upon receiving an incoming call from a communication destination of which information had been deleted;

DESCRIPTION OF EMBODIMENTS

Hereinafter, embodiments of a terminal device, a communication processing method and a phone-book management method that are disclosed in this application will be described with reference to the attached drawings. It should be noted that the present invention is not limited to the following embodiments.

First Embodiment

Configuration of Terminal Device According to First Embodiment

Figure 1:
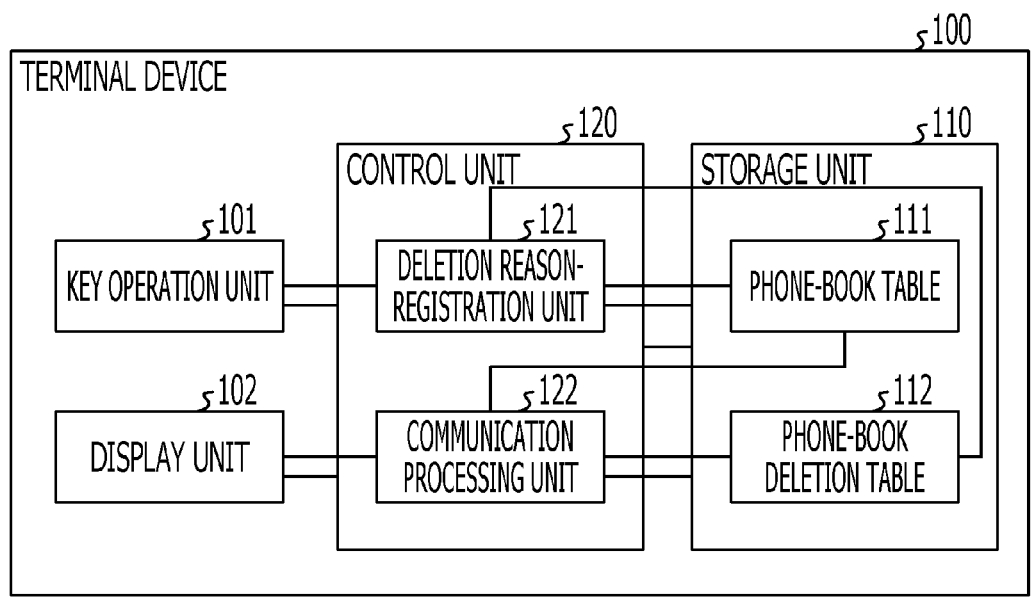
FIG. 1 illustrates an exemplary configuration of a terminal device according to a first embodiment.

First, the configuration of a terminal device according to a first embodiment will be described with reference to FIG. 1. FIG. 1 illustrates an exemplary configuration of a terminal device according to the first embodiment.

For example, a terminal device 100 includes a key operation unit 101, a display unit 102, a storage unit 110, and a control unit 120, as illustrated in FIG. 1. Further, the terminal device 100 is a mobile terminal device including a personal handy-phone system (PHS), a personal digital assistant (PDA), a mobile phone, etc. Although not illustrated in FIG. 1, the terminal device 100 includes various function units relating to communications including the transmission and/or reception of electronic mail, a conversation, and so forth, which are included in a widely distributed mobile phone.

The key operation unit 101 includes push buttons, a jog dial, etc. that are provided to operate the terminal device 100 and accepts various types of data transmitted to the terminal device 100. For example, the key operation unit 101 accepts information indicating that information included in phone-book information is to be deleted and deletion reason information, and transmits the above-described information to a deletion reason-registration unit 12 through a key operation performed through a user of the terminal device 100.

For deleting information included in the phone-book information through the use of the key operation unit 101, the information for deletion is selected from the phone-book information which had been called up, for example. Further, for transmitting the deletion reason information through the use of the key operation unit 101, the transmission is attained through, for example, selecting the deletion reason data through a radio button, transmitting the deletion reason data into a text box, and so forth.

The display unit 102 includes a display (and/or a touch-panel display) functioning as a display device that displays and transmits various types of information, a speaker, and so forth. For example, the display unit 102 displays and transmits information including the deletion reason information relating to information deleted from the phone-book information under the control of a communication processing unit 122 that will be described later.

The storage unit 110 stores data used by the control unit 120 executing various processing procedures and data of the result of the various processing procedures executed through the control unit 120, and includes phone-book table data 111 and phone-book deletion table data 112. Further, the storage unit 110 is, for example, a semiconductor memory element including a random access memory (RAM), a read only memory (ROM), a flash memory, etc. and/or a storage device including a hard disk, an optical disk, etc.

The phone-book table data 111 includes information relating to a communication destination. For example, the phone-book table data 111 includes information items of No. (the memory numbers), names, phone numbers, electronic mail addresses, the last conversation-date and time illustrating the date and time of the latest conversation with the communication destination, a deletion flag illustrating the deletion target shown in the phone-book table data 111, and so forth in association with one another. Here, the information item for which the deletion flag is set is not deleted from the phone-book table data 111. However, the information item is not externally transmitted in response to a basic call made through the terminal device 100.

Information included in the phone-book table data 111 is shown as, for example, the memory number "1", the name "Ataroh", the phone number "090-1111-1111", the electronic mail address "Atarou@xxx.ne.jp", the last conversation-date and time "06/01/2009 12:30:00", and the deletion flag "(no data)". FIG. 2 illustrates exemplary information included in the phone-book table data 111.

The phone-book deletion table data 112 includes information about the deletion-date and time, and the deletion reason that relate to information for which the deletion flag is set, the information being included in the phone-book table data 111. For example, the phone-book deletion table data 112 includes information items of the memory number "2", the deletion-date and time "04/20/2009 09:00:00", and the deletion reason "onetime colleague" in association with one another, as illustrated in FIG. 3. Here, FIG. 3 illustrates exemplary information included in the phone-book deletion table data 112.

The control unit 120 includes an internal memory provided to store a control program, a program stipulating various processing procedures or the like, and appropriate data, and a deletion reason-registration unit 121 and the communication processing unit 122. Further, the control unit 120 is, for example, an integrated circuit including an application specific integrated circuit (ASIC), a field programmable gate array (FPGA), etc. and/or an electronic circuit including a central processing unit (CPU), a microprocessing unit (MPU), etc.

The deletion reason-registration unit 121 registers the deletion target information and the deletion reason information with a storage unit storing information about the communication destination. More specifically, the deletion reason-registration unit 121 accepts information transmitted through the key operation unit 101, where the information includes information indicating that the information item "No. 2" registered with the phone-book table data 111 is to be deleted and the deletion reason information "onetime colleague".

Then, the deletion reason-registration unit 121 sets the deletion flag information "O" for the memory number information "2" registered with the phone-book table data 111. Additionally, the deletion reason-registration unit 121 registers the memory number information "2", the deletion-date and time information "04/20/2009 09:00:00", and the deletion reason information "onetime colleague" with the phone-book deletion table data 112 in association with one another.

Here, the details of the deletion reason information registered with the phone-book deletion table data 111 through the deletion reason-registration unit 121 may not only be the above-described "onetime colleague", but may also be various circumstances including "estrangement", "quarrel", and so forth.

The communication processing unit 122 acquires the deletion reason information registered by the deletion reason-registration unit 121 from the phone-book information, and executes communication processing based on the acquired deletion reason information. The above-described example will be described more specifically. Namely, the communication processing unit 122 accepts an incoming call from "Bjiroh" corresponding to the memory number information "2" for which the deletion flag information "O" is set, where information about the "Bjiroh" is registered with the phone-book table data 111. Then, the communication processing unit 122 acquires the deletion reason information "onetime colleague" registered through the deletion reason-registration unit 121 from the phone-book deletion table data 112.

Next, the communication processing unit 122 permits the incoming call as an operation based on the acquired deletion reason information "onetime colleague". Here, the communication processing unit 122 refuses the incoming call when the details of the acquired deletion reason information are shown as "quarrel" and/or executes a phone-answering function when the details of the acquired deletion reason information are shown as "estrangement".

Further, the communication processing unit 122 may perform control to display the acquired deletion reason information on the display unit 102 for receiving and/or refusing the incoming call. More specifically, the communication processing unit 122 performs control to display information including the acquired deletion reason information "onetime colleague" on the display unit 102. The information displayed on the display unit 102 for the control includes, for example, the deletion-date and time information and information about the name of a communication destination, the deletion reason information, and information indicating whether or not the incoming call should be accepted, as illustrated in FIG. 4. Here, FIG. 4 illustrates an exemplary display screen attained upon receiving an incoming call from the communication destination of which information had been deleted.

On the other hand, upon receiving an incoming call from the communication destination "Ataroh" corresponding to the memory number information "1" registered with the phone-book table data 111, that is, an incoming call from a communication destination for which no deletion flag information is set, the communication processing unit 122 performs control to display information including information about the name or the like of the communication destination on the display unit 102.

After that, the terminal device 100 starts a conversation upon receiving an incoming call through the key operation unit 101 operated by a user (the selection of "yes", the press-down of a button provided to start communications, etc.), and interrupts the communications when the incoming call is refused through the key operation unit 101 operated by the user (the selection of "no", the press-down of a button provided to interrupt communications, etc.).

Deletion Reason-Registration Processing Procedures
According to First Embodiment Next, the flow of the deletion reason-registration processing procedures according the first embodiment will be described with reference to a flowchart illustrated in FIG. 5. The deletion reason-registration processing procedures are performed through the deletion reason-registration unit 121.

Figure 5:
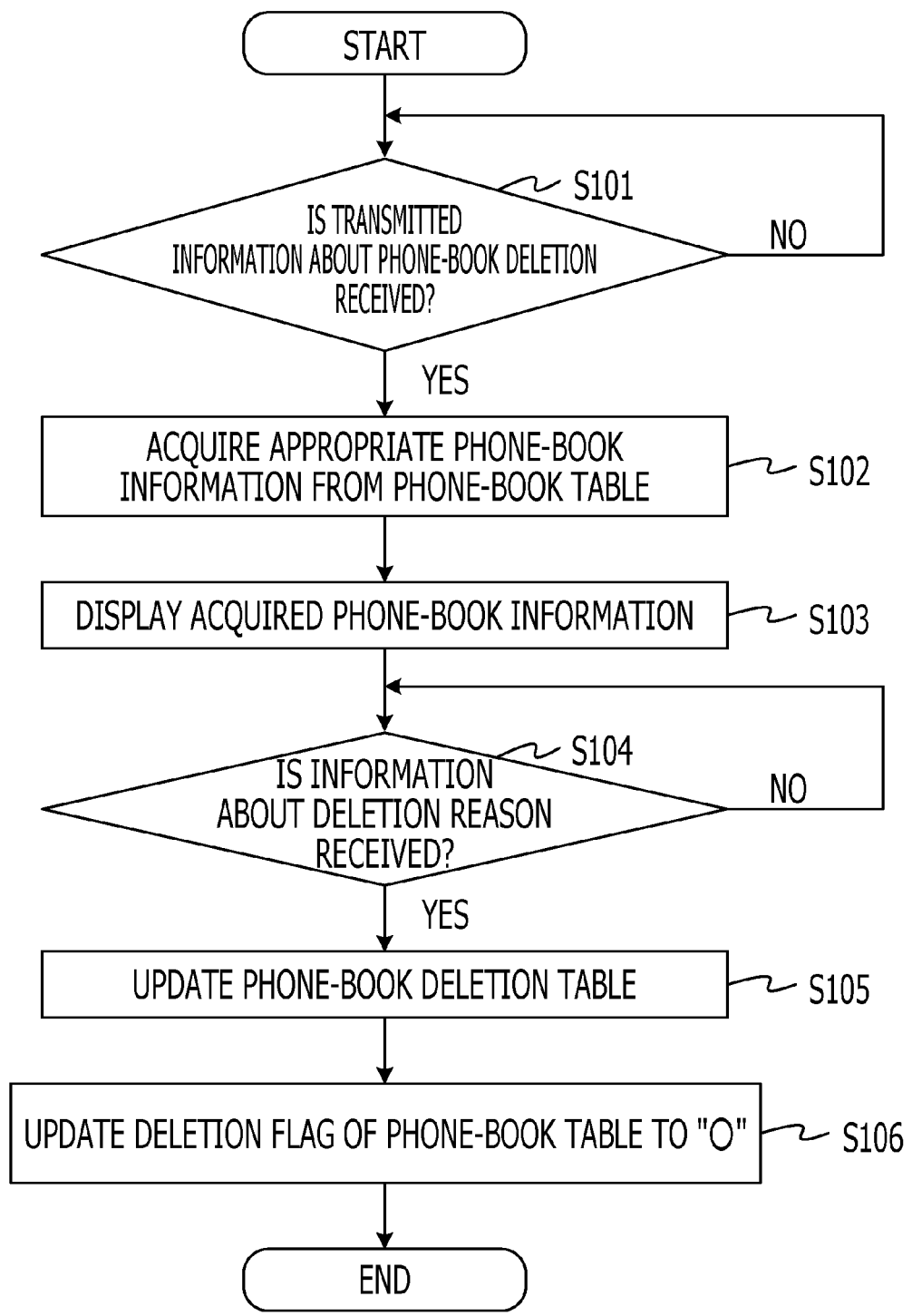
FIG. 5 is a flowchart illustrating the flow of deletion reason-registration processing procedures according to the first embodiment.

For example, upon receiving information indicating that the memory number information "2" registered with the phone-book table data 111 should be deleted (when the answer is "yes" at step S101), the information being transmitted through the key operation unit 101, the deletion reason-registration unit 121 acquires the phone-book information corresponding to the memory number information "2" from the phone-book table data 111 (step S102), as illustrated in FIG. 5. When the information indicating that the information registered with the phone-book table data 111 should be deleted is not received (when the answer is "no" at step S101), the deletion reason-registration unit 121 enters a standby state for the reception of the above-described deletion information.

Then, the deletion reason-registration unit 121 makes the display unit 102 display and externally transmit the name information "Bjiroh", the phone number information "090-2222-2222", etc., as the phone-book information corresponding to the memory number information "2" (step S103). Next, the deletion reason-registration unit 121 determines whether or not information about the deletion reason is received (step S104).

After that, upon receiving the deletion reason information "onetime colleague" (when the answer is "yes" at step S104), the deletion reason-registration unit 121 registers the memory number information "2", the deletion-date and time information "04/20/2009 09:00:00", and the deletion reason information "onetime colleague" with the phone-book deletion table data 112 in association with one another (step S105). Then, the deletion reason-registration unit 121 updates the details of the deletion flag set for the memory number information "2" registered with the phone-book table data 111 to the sign "O" and terminates the processing procedures (step S106). When the deletion reason information is not received (when the answer is "no" at step S104), the deletion reason-registration unit 121 enters a standby state for the reception of the above-described deletion reason information.

Communication Processing Procedures According to
First Embodiment

Figure 6:
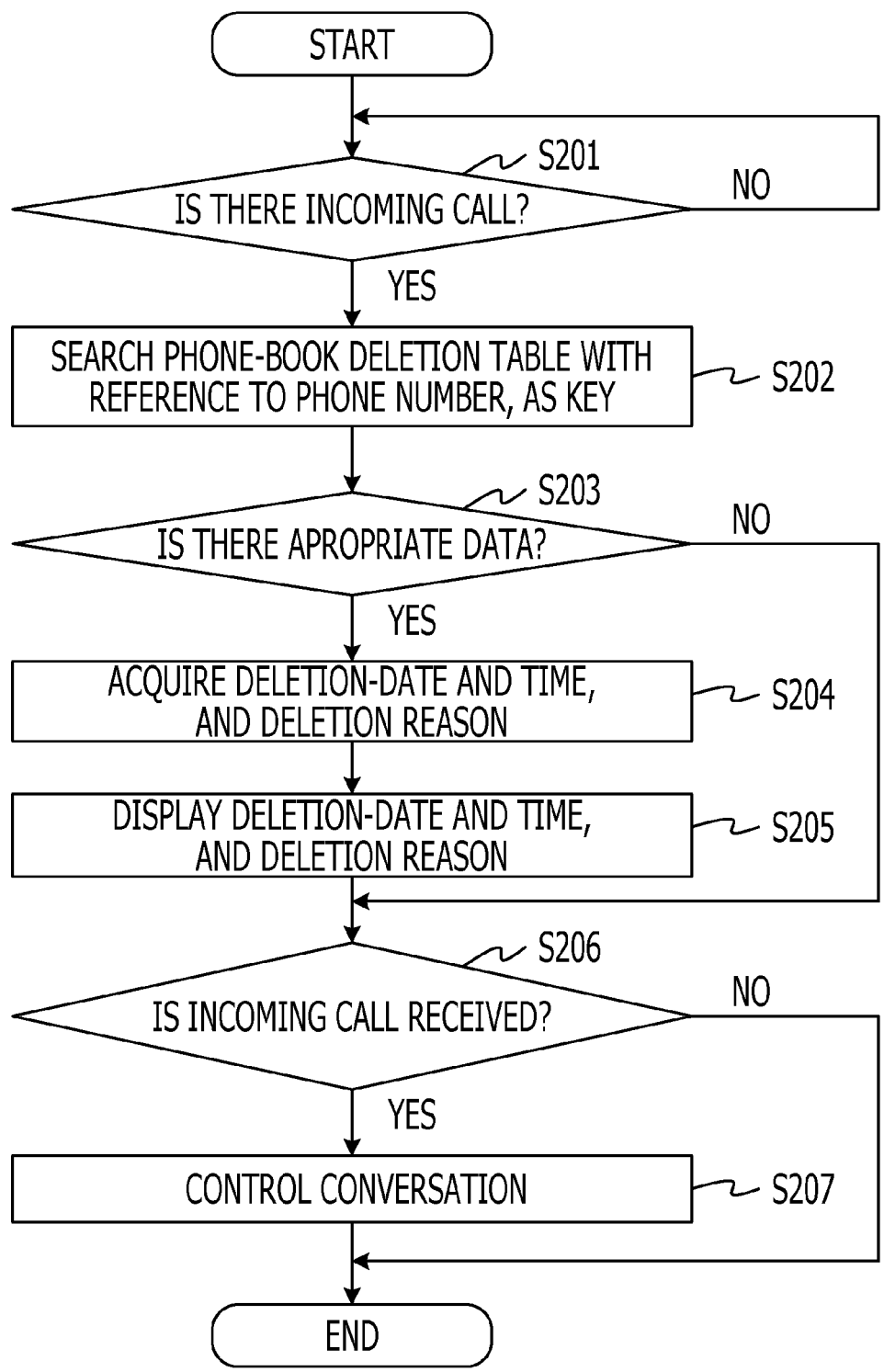
FIG. 6 is a flowchart illustrating the flow of communication processing procedures according to the first embodiment.

Next, the flow of communication processing procedures according to the first embodiment will be described with reference to a flowchart illustrated FIG. 6. The communication processing procedures are performed through the communication processing unit 122.

For example, upon receiving an incoming call from the communication destination corresponding to the phone number information "090-2222-2222" registered with the phone-book table data 111 (when the answer is "yes" at step S201), the communication processing unit 122 acquires the memory number information "2" from the phone-book table data 111 with reference to the phone-number information, as a key, and searches the phone-book deletion table 112 based on the acquired memory number information "2" (step S202). When no incoming call is received (when the answer is "no" at step S201), the communication processing unit 122 enters the standby state for the reception of an incoming call.

Then, when the phone-book deletion table data 112 includes the appropriate memory number information "2" (when the answer is "yes" at step S203), the communication processing unit 122 acquires the name information "Bjiroh" of the communication destination, the deletion-time and date information "04/20/2009 09:00:00", and the deletion reason information "onetime colleague" (step S204). Next, the communication processing unit 122 performs control to display the acquired name information, deletion-date and time information, and deletion reason information, and information indicating whether or not an incoming call should be received on the display unit 102 (step S205).

After that, upon receiving the incoming call (when the answer is "yes" at step S206), the terminal device 100 controls a conversation with the communication destination "Bjiroh" (step S207). When the phone-book deletion table data 112 does not include the appropriate memory number information "2" (when the answer is "no" at step S203), the communication processing unit 122 performs the processing corresponding to step S206. Further, when refusing the incoming call (when the answer is "no" at step S206), the terminal device 100 terminates the processing procedures without performing the conversation control.

As described above, the terminal device 100 registers the deletion flag information and the deletion reason information with information determined to be the deletion target in the phone-book information, and controls communications based on the deletion reason information upon receiving an incoming call from a communication destination determined to be the deletion target. Consequently, it becomes easy to determine whether or not a phone call should be received.

Second Embodiment

In the above-described first embodiment, the transmitted deletion reason information is received and registered. However, information about an arbitrary deletion reason may be registered when a specified condition relating to communications with a communication destination is satisfied. Hereinafter, therefore, an embodiment where the arbitrary deletion reason information is registered when the specified condition relating to the communications with the communication destination is satisfied will be described.

Configuration of Terminal Device According to Second Embodiment

Figure 7:
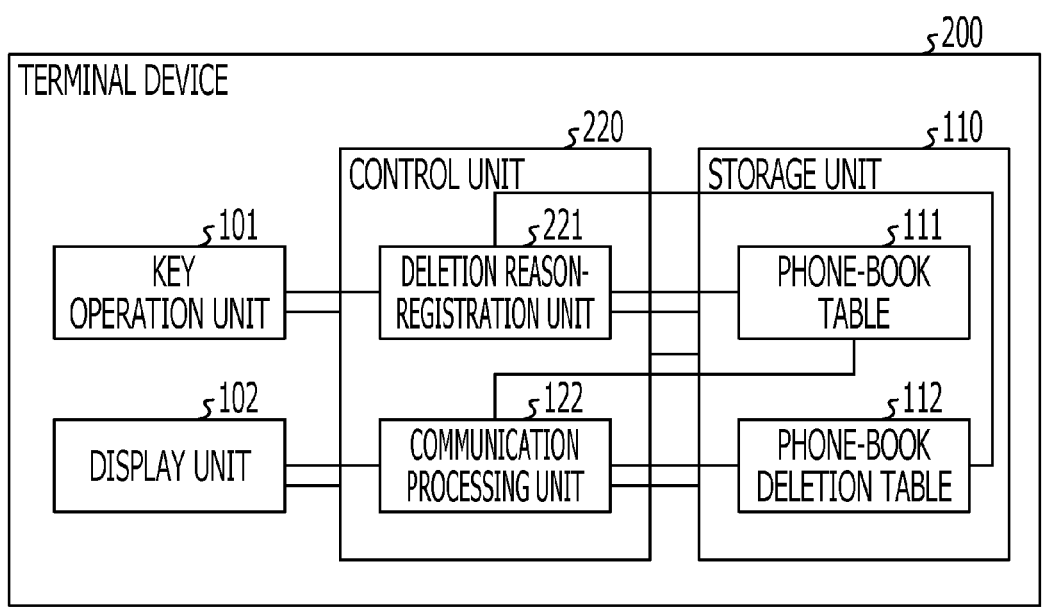
FIG. 7 illustrates an exemplary configuration of a terminal device according to a second embodiment.

First, an exemplary configuration of a terminal device 200 according to the second embodiment will be described with reference to FIG. 7. In FIG. 7, the same components as those of the terminal device 100 according to the first embodiment are designated by the same reference numerals. In the following embodiment, descriptions of the same processing procedures as those performed through the terminal device 100 according to the first embodiment will be omitted.

For example, the terminal device 200 includes the key operation unit 101, the display unit 102, the storage unit 110, and a control unit 220, as illustrated in FIG. 7.

The storage unit 110 stores data appropriate for various types of processing performed through the control unit 220 and/or information about the result of the various types of processing performed through the control unit 220, and includes the phone-book table data 111 and the phone-book deletion table data 112. Further, the storage unit 110 is, for example, a semiconductor memory element including a random access memory (RAM), a read only memory (ROM), a flash memory, etc. and/or a storage device including a hard disk, an optical disk, etc.

The control unit 220 includes an internal memory provided to store a control program, a program stipulating various processing procedures or the like, and appropriate data, and a deletion reason-registration unit 221 and the communication processing unit 122. Further, the control unit 220 is, for example, an integrated circuit including an application specific integrated circuit (ASIC), a field programmable gate array (FPGA), etc. and/or an electronic circuit including a central processing unit (CPU), a microprocessing unit (MPU), etc.

The deletion reason-registration unit 221 registers the deletion flag information and the deletion reason information with the phone-book information when a specified condition relating to communications with a communication destination is satisfied. For example, when the phone-book table data 111 includes information indicating that at least a specified time such as three months had elapsed from the date and time of the last conversation, where information about the date and time is registered with the phone-book table data 111, the deletion reason-registration unit 221 sets the deletion flag information "O" for the appropriate information of the phone-book table data 111, and registers the deletion reason information "estrangement" with the phone-book deletion table data 112.

Further, for example, when a conversation is made at a specified volume level or more during communications with the communication destination, the deletion reason-registration unit 221 sets the deletion flag information "O" for the appropriate information included in the phone-book table data 111 and registers the deletion reason information "quarrel" with the phone-book deletion table data 112.

Further, upon being triggered by a change in the company address-column data, the change being made due to the moving of the company of a user owning the terminal device 200, and/or a change in the personal information such as an electronic mail address, for example, the deletion reason-registration unit 221 sets the deletion flag information "O" for each of the information items corresponding to cooperation companies that are registered with the phone-book table data 111 as group information and registers deletion reason information "moving of company and/or department" with the phone-book deletion table data 112.

Deletion Reason-Registration Processing Procedures According to Second Embodiment Next, the flow of deletion reason-registration processing procedures according to the second embodiment will be described with reference to a flowchart illustrated in FIG. 8. The deletion reason-registration processing procedures are performed through the deletion reason-registration unit 221. In the flowchart described below, processing procedures performed to register the deletion reason information for phone-book information indicating no conversation had been made over at least a specified time period will be described.

Figure 8:
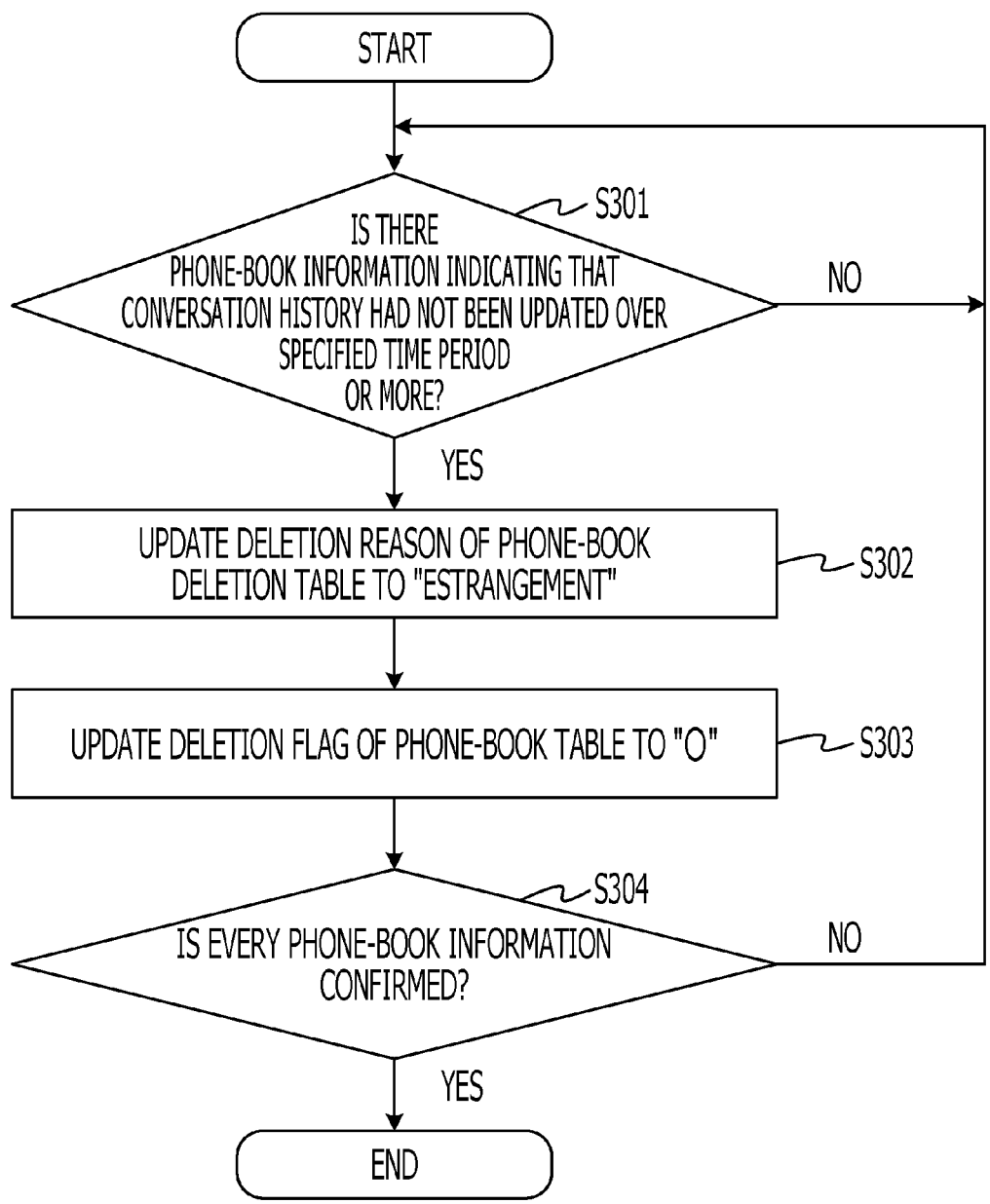
FIG. 8 is a flowchart illustrating the flow of deletion reason-registration processing procedures according to the second embodiment.

For example, when the phone-book table data 111 shows information indicating that the conversation history had not been updated over at least a specified time period such as three months (when the answer is "yes" at step S301), as illustrated in FIG. 8, the deletion reason-registration unit 221 registers the deletion reason information "estrangement" with the phone-book deletion table data 112 (step S302) for the appropriate information. Further, when the phone-book table data 111 shows no information indicating that the conversation history had not been updated over at least the specified time period (when the answer is "no" at step S301), the deletion reason-registration unit 221 performs the processing corresponding to step S301 again. A determination of whether or not the information indicating that the conversation history had not been updated over at least the specified time period may be made at regular time intervals, that is, every three days or ten days, for example.

Then, the deletion reason-registration unit 221 updates the details of the deletion flag included in the phone-book table data 111 to the sign "O" (step S303) for the appropriate information. After that, the deletion reason-registration unit 221 terminates the processing procedures when every information is confirmed based on the date and time of the last conversation of which information is included in the phone-book table data 111 (when the answer is "yes" at step S304). Further, the deletion reason-registration unit 221 performs the processing corresponding to step S301 when every information is not confirmed (when the answer is "no" at step S304).

As described above, the terminal device 200 determines phone-book information relating to a communication destination from which the terminal device 200 receives no incoming call over at least a specified time period to be the deletion target, registers the deletion flag information and the deletion reason information for the above-described phone-book information, and controls communications based on the deletion reason information upon receiving an incoming call from the communication destination determined to be the deletion target. Therefore, it becomes possible to easily determine whether or not the incoming call should be received without performing a complicated operation through the user owning the terminal device 200.

Third Embodiment

According to the first embodiment and/or the second embodiment, the phone-book information stored in the terminal device owned by a person is used. However, the phone-book information may be stored in a server device provided on a network for use. In the following embodiment, therefore, the phone-book information is stored in a phone-book management apparatus functioning as the server device provided on the network for use.

System Configuration According to Third Embodiment

Further, an exemplary configuration of a system including a phone-book management apparatus according to a third embodiment will be described with reference to FIG. 9.

Figure 9:
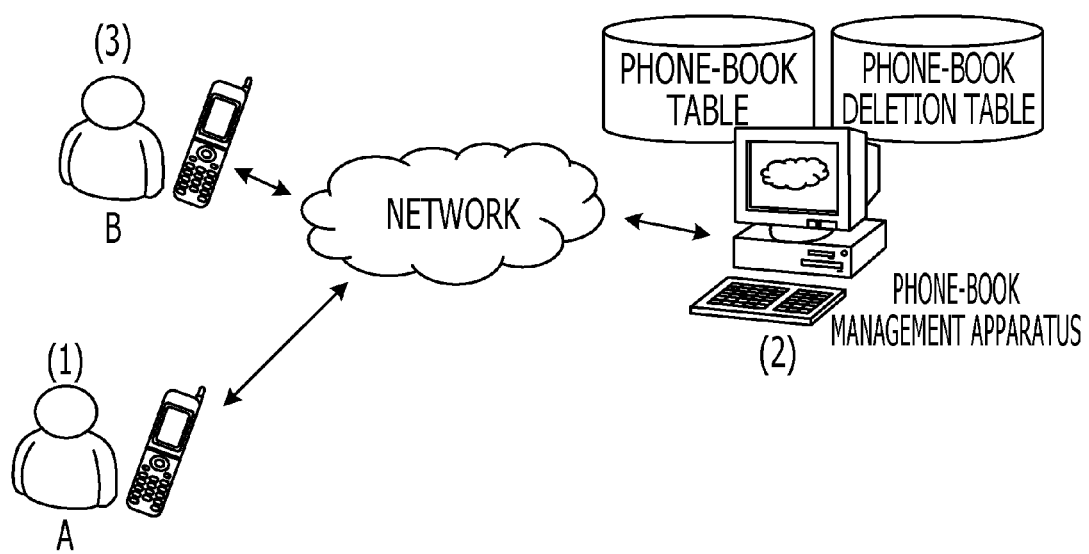
FIG. 9 illustrates an exemplary configuration of a system including a phone-book management apparatus according to a third embodiment.

As illustrated in FIG. 9, for example, the system including the phone-book management apparatus includes a plurality of terminal devices and the phone-book management apparatus. In FIG. 9, the plurality of terminal devices includes, for example, a terminal device A owned by a user A and a terminal device B owned by a user B. Then, the terminal devices A and B, and the phone-book management apparatus are communicably connected to one another via a network. Further, the network may be, for example, a circuit switched network that can perform various communications through mobile phones, the Internet Protocol (IP) network, etc. Further, the phone-book management apparatus includes the phone-book table data and the phone-book deletion table data that have been described in the first embodiment and/or the second embodiment.

In the above-described configuration, the terminal device A transmits data to the terminal device B owned by the user B, as illustrated in Part (1) of FIG. 9. According to the phone-book information of the user B (the phone-book table data stored in the phone-book management apparatus), information about the user A is determined to be the deletion target, namely, the deletion flag information is set for the information of the user A.

Further, the phone-book management apparatus searches the phone-book table data corresponding to the user B upon receiving the data transmitted from the terminal device A, as illustrated in Part (2) of FIG. 9. Then, the phone-book management apparatus detects that the deletion flag information is set for the phone-book information of the terminal device A, the phone-book information being shown on the phone-book table data corresponding to the user B. Next, the phone-book management apparatus transmits information including information about the name of the user A, the date and time of deletion, the deletion reason, etc. to the terminal device B.

Further, the terminal device B displays information denoting that the phone number corresponding to an incoming call being made indicates the user A, the deletion reason information, etc. on the display unit, as illustrated in Part (3) of FIG. 9. After that, the terminal device B communicates with the terminal device A and/or interrupts communications with the terminal device A based on information indicating the incoming call should be accepted and/or refused, the information being transmitted from the user B owning the terminal device B.

When the above-described network is a network configured to transmit a large amount of data at one time with difficulty, as is the case with a circuit switched network, the phone-book management apparatus may temporarily notify the terminal device B that the communication destination is the deletion target and an incoming call from the communication destination is received, accept an inquiry about the phone number, the inquiry being made by the terminal device B, and transmit information including information about the name of the user A, the date and time of deletion, and the deletion reason to the terminal device B.

Configuration of Phone-Book Management Apparatus According to Third Embodiment

Next, an exemplary configuration of a phone-book management apparatus 150 according to the third embodiment will be described with reference to FIG. 10.

Figure 10:
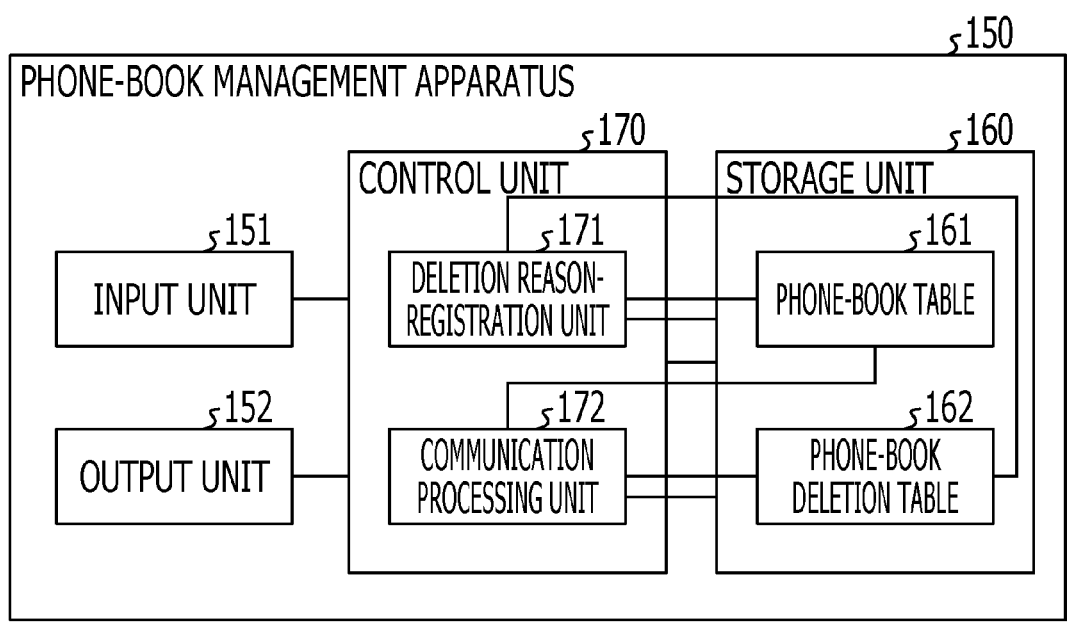
FIG. 10 illustrates an exemplary configuration of the phone-book management apparatus according to the third embodiment.

For example, the phone-book management apparatus 150 includes an input unit 151, an output unit 152, a storage unit 160, and a control unit 170, as illustrated in FIG. 10.

The input unit 151 includes, for example, a keyboard, a mouse, etc. to receive various types of information transmitted to the phone-book management apparatus 150. Further, the output unit 152 includes, for example, a monitor (otherwise a display, a touch-panel display, etc.) and/or a speaker to externally transmit various types of information stored in the phone-book management apparatus 150.

The storage unit 160 stores data used by the control unit 170 executing various processing procedures and data of the result of the various processing procedures executed through the control unit 170, and includes phone-book table data 161 and phone-book deletion table data 162. Further, the storage unit 160 is, for example, a semiconductor memory element including a random access memory (RAM), a read only memory (ROM), a flash memory, etc. and/or a storage device including a hard disk, an optical disk, etc.

The phone-book table data 161 includes information about a communication destination of a terminal device that can communicate with the phone-book management apparatus 150 via a network. For example, the phone-book table data 161 includes information items of No. (the memory numbers), names, phone numbers, electronic mail addresses, the last conversation-date and time illustrating the date and time of the latest conversation with the communication destination, a deletion flag illustrating the deletion target shown in the phone-book table data 161, and so forth in association with one another. Here, since various types of information included in the phone-book table data 161 is the same as that of the phone-book table data 111 illustrated in the first embodiment and/or the second embodiment, the detailed description thereof will be omitted.

The phone-book deletion table data 162 includes information about the date and time of deletion, and the deletion reason that relates to information for which the deletion flag information is set, the information being included in the phone-book table data 161. Since various types of information included in the phone-book deletion table data 162 are the same as that of the phone-book deletion table data 112 illustrated in the first embodiment and/or the second embodiment, the detailed description thereof will be omitted.

The control unit 170 includes an internal memory provided to store a control program, a program stipulating various processing procedures or the like, and appropriate data, and a deletion reason-registration unit 171 and a communication processing unit 172. Further, the control unit 170 is, for example, an integrated circuit including an application specific integrated circuit (ASIC), a field programmable gate array (FPGA), etc. and/or an electronic circuit including a central processing unit (CPU), a micro processing unit (MPU), etc.

The deletion reason-registration unit 171 registers the deletion flag information indicating the deletion target in phone-book information including information about a communication destination of a terminal device that can communicate with the phone-book management apparatus 150 via a network and the deletion reason information with the phone-book information. More specifically, the deletion reason-registration unit 171 receives information transmitted through the terminal device, where the information includes information indicating that information "No. 2" registered with the phone-book table data 161 should be deleted and the deletion reason information "onetime colleague".

Then, the deletion reason-registration unit 171 sets the deletion flag information "O" for the memory number information "2" registered with the phone-book table data 161. Additionally, the deletion reason-registration unit 171 registers the memory number information "2", the deletion-date and time information "04/20/2009 09:00:00", and the deletion reason information "onetime colleague" with the phone-book deletion table data 162 in association with one another.

Here, the details of the deletion reason information registered with the phone-book deletion table data 162 through the deletion reason-registration unit 171 may not only be the above-described "onetime colleague", but may also be various circumstances including "estrangement", "quarrel", and so forth.

The communication processing unit 172 acquires the deletion reason information registered through the deletion reason-registration unit 171 from the phone-book information, and executes communication processing based on the acquired deletion reason information. The above-described example will be described more specifically. Namely, upon receiving an incoming call from "Bjiroh" corresponding to the memory number information "2" registered with the phone-book table data 161, the communication processing unit 172 acquires the deletion reason information "onetime colleague" registered through the deletion reason-registration unit 171 from the phone-book deletion table data 162.

Then, the communication processing unit 172 permits the incoming call as a operation based on the acquired deletion reason information "onetime colleague" and notifies the terminal device of the incoming call. Here, the communication processing unit 172 refuses the incoming call when the details of the acquired deletion reason information indicate "quarrel" and/or executes a phone-answering function when the details of the acquired deletion reason information indicate "estrangement".

Further, the communication processing unit 172 may notify the terminal device of the acquired deletion reason information for receiving and/or refusing the incoming call. More specifically, the communication processing unit 122 notifies the terminal device of information including the acquired deletion reason information "onetime colleague". At that time, the terminal device performs control to display information transmitted from the phone-book management apparatus 150 as a notification on a display unit. The above-described displayed information includes, for example, the deletion-date and time information and information about the name of a communication destination, the deletion reason information, and information indicating whether or not the incoming call should be received.

On the other hand, upon receiving an incoming call from the communication destination "Ataroh" corresponding to the memory number information "1" registered with the phone-book table data 161, that is, an incoming call from a communication destination for which no deletion flag information is set, the communication processing unit 172 notifies the terminal device of information including the information about the name of the communication destination.

After that, the terminal device starts a conversation upon receiving the incoming call through a key operation performed by a user and interrupts communications when the incoming call is refused through a key operation performed by the user.

Communication Processing Procedures According to Third Embodiment

Figure 11:
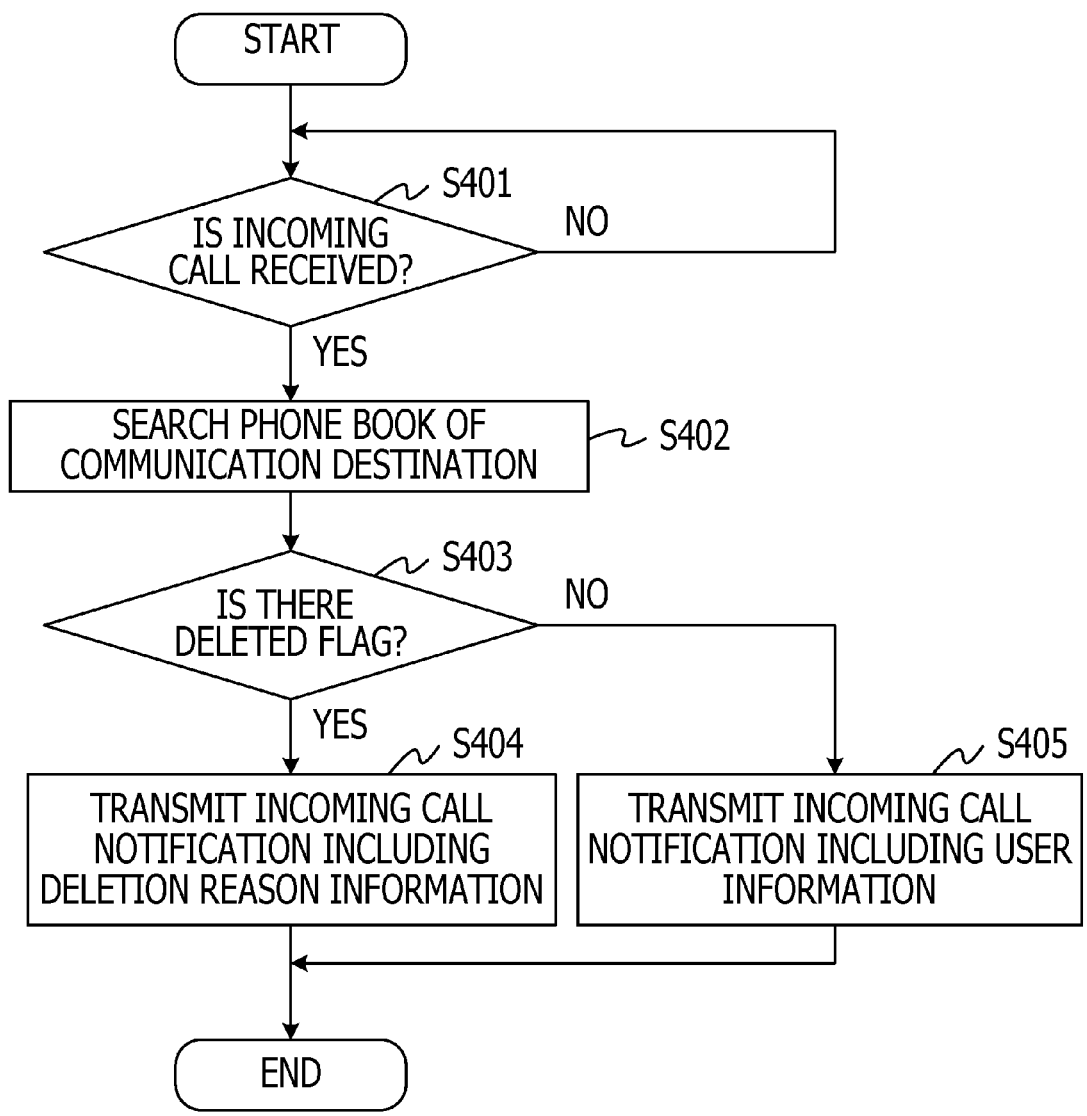
FIG. 11 is a flowchart illustrating the flow of communication processing procedures according to the third embodiment.

Next, the flow of communication processing procedures according to the third embodiment will be described with reference to a flowchart illustrated in FIG. 11. The communication processing procedures are performed through the communication processing unit 172.

For example, upon receiving an incoming call-notification (a notification transmitted from the terminal device) from the communication destination corresponding to the phone number information "090-2222-2222" registered with the phone-book table data 161 (when the answer is "yes" at step S401), the communication processing unit 172 acquires the memory number information "2" from the phone-book table data 161 with reference to the received phone-number information, as a key, and searches the phone-book deletion table data 162 based on the acquired memory number information "2" (step S402). When no incoming call is received (when the answer is "no" at step S401), the communication processing unit 172 enters the standby state for the reception of an incoming call from the terminal device.

Then, when the phone-book deletion table data 162 includes the appropriate memory number information "2" (when the answer is "yes" at step S403), the communication processing unit 172 acquires the name information "Bjiroh" corresponding to the communication destination of the terminal device, the deletion-time and date information "04/20/2009 09:00:00", and the deletion reason information "onetime colleague". Next, the communication processing unit 172 transmits information including the acquired name information, deletion-date and time information, and deletion information to the terminal device (step S404).

Further, when the phone-book deletion table data 162 does not include the appropriate memory number information "2" (when the answer is "no" at step S403), the communication processing unit 172 transmits incoming call-notification data including the appropriate user information included in the phone-book table data 161 to the terminal device (step S405). Upon receiving the incoming call-notification data transmitted from the phone-book management apparatus 150, the terminal device controls communications with the communication destination "Bjiroh".

Communication Processing Sequence According to Third Embodiment

Next, the flow of communication processing procedures that are performed in a system according to the third embodiment will be described with reference to a sequence diagram of FIG. 12. Hereinafter, data is transmitted from the terminal device A to the terminal device B.

Figure 12:
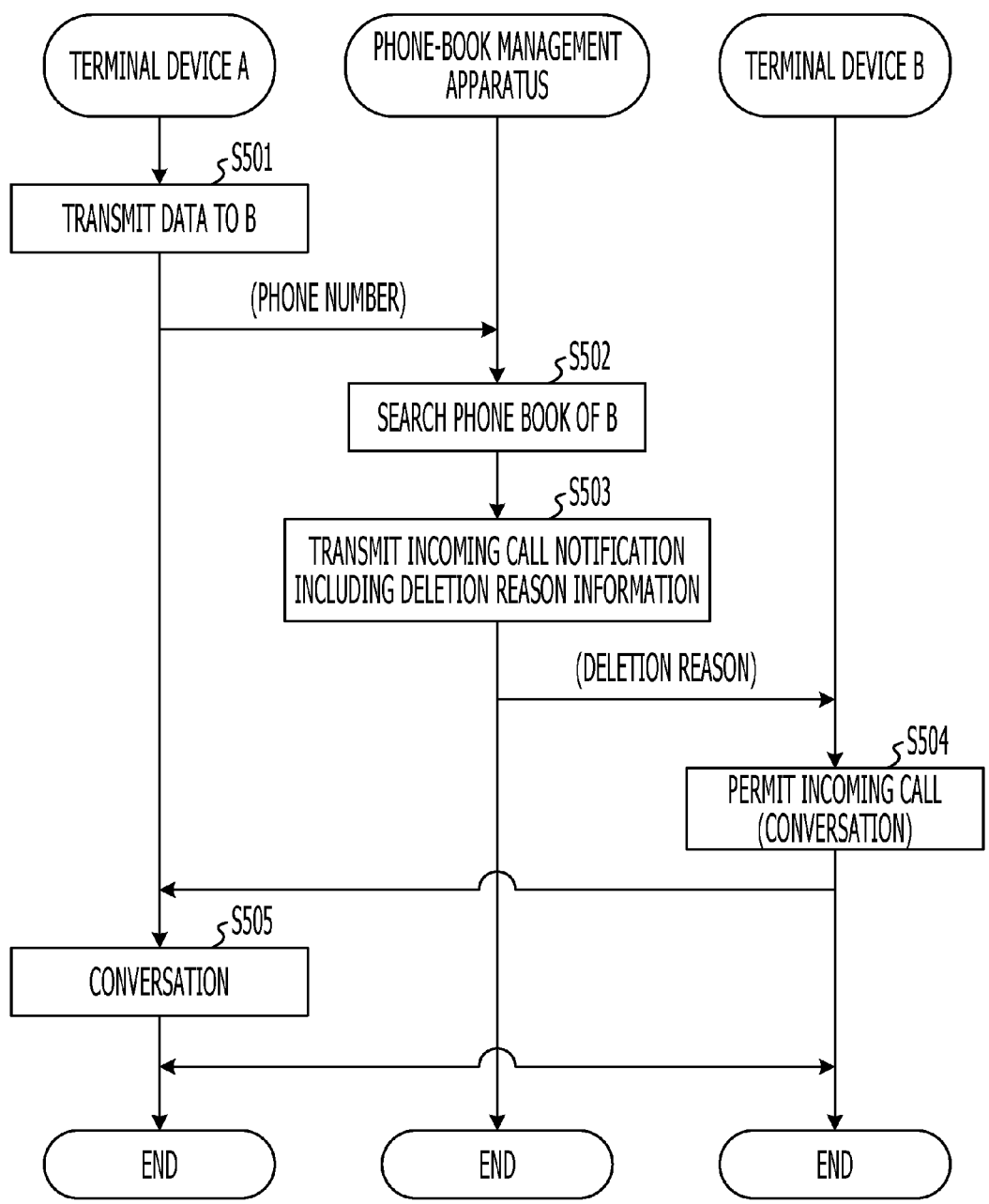
FIG. 12 is a sequence diagram illustrating the flow of the communication processing procedures according to the third embodiment.

For example, the terminal device A transmits the data to the terminal device B (step S501), as illustrated in FIG. 12. Then, the phone-book management apparatus 150 searches for memory number information included in the phone-book data 161 with reference to phone-number information included in the data transmitted from the terminal device A, as a key, and acquires the deletion reason information corresponding to the searched memory number information from the phone-book deletion table data 162 (step S502).

Next, the phone-book management apparatus 150 transmits information including the acquired deletion reason information, that is, incoming notification data including the name information, the deletion-date and time information, the deletion reason information, etc. to the terminal device B (step S503). After that, the terminal device B transmits the information including the deletion reason information to the display unit for display.

Upon receiving incoming call-permission data transmitted through an operation performed by a user owning the terminal device B, the terminal device B starts controlling a conversation with the terminal device A (step S504). Otherwise, the terminal device A starts controlling a conversation with the terminal device B under the conversation control of the terminal device B (step S505).

As described above, the phone-book management apparatus 150 registers the deletion flag information and the deletion reason information with information determined to be the deletion target in the phone-book information, and notifies the terminal device that communications should be controlled based on the deletion reason information upon being notified of an incoming call from a communication destination determined to be the deletion target. Consequently, it becomes easy to determine whether or not a phone call should be received.

Fourth Embodiment

Thus, the embodiments of the terminal devices and the phone-book management apparatus that are disclosed in this application have been described. However, the terminal devices and the phone-book management apparatus may be achieved in various different modes without being limited to the above-described embodiments. Therefore, different embodiments of (1) Cancellation of Registered deletion flag, (2) Electronic mail, (3) Updating Deletion flag through Phone-book management apparatus, (4) Configuration of Terminal device, (5) Configuration of Phone-book management apparatus, (6) Communication processing program provided as Terminal device, and (7) Communication processing program provided as Phone-book management apparatus will be described.

(1) Cancellation of Registered Deletion Flag

In the above-described first, second, and third embodiments, the registration of information determined to be the deletion target in the phone-book information and the communication processing procedures that are performed through the use of the registered information, the registration and the communication processing procedures being performed through the terminal device and/or the phone-book management apparatus, have been described. However, the information registered as the deletion target may be cancelled.

Hereinafter, an exemplary configuration of a terminal device 300 according to a fourth embodiment will be described with reference to FIG. 13. Since registration cancellation processing performed through the phone-book management apparatus is the same as that performed through the terminal device 300, the description thereof will be omitted. Further, in FIG. 13, the same components as those of the terminal device 100 according to the first embodiment will be designated by the same reference numerals and the description of the same processing as that performed through the terminal device 100 will be omitted.

Figure 13:
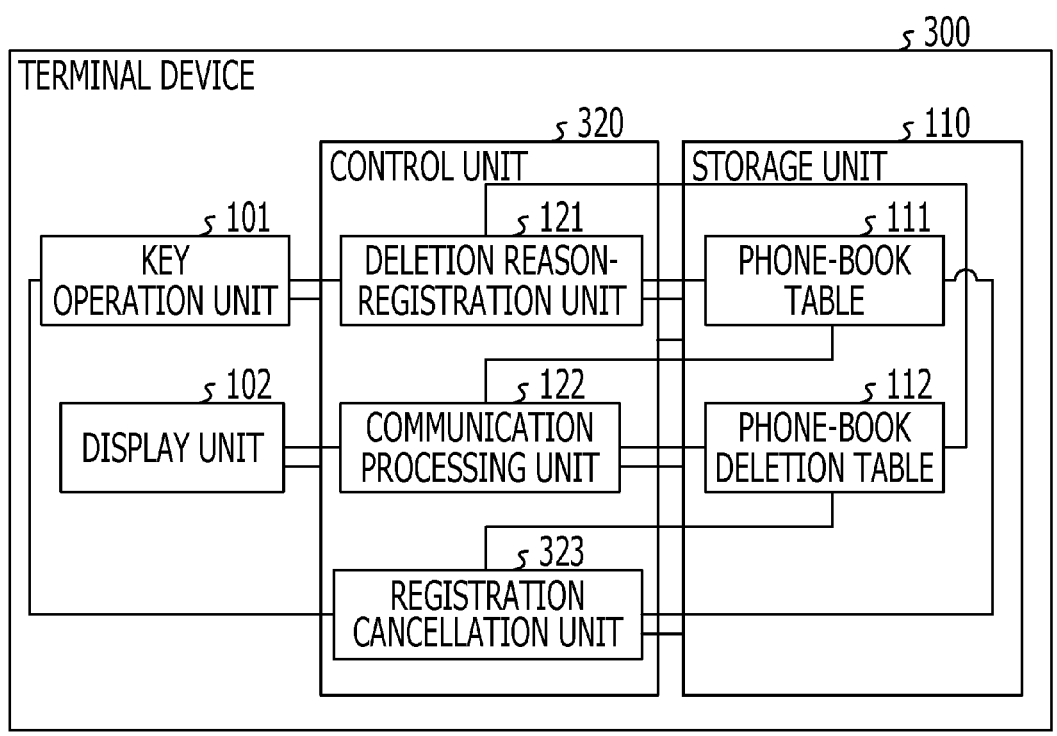
FIG. 13 illustrates an exemplary configuration of a terminal device according to a fourth embodiment.

For example, the terminal device 300 includes the key operation unit 101, the display unit 102, the storage unit 110, and a control unit 320, as illustrated in FIG. 13.

The storage unit 110 stores data used by the control unit 320 executing various processing procedures and data of the result of the various processing procedures executed through the control unit 320, and includes the phone-book table data 111 and the phone-book deletion table data 112. Further, the storage unit 110 is, for example, a semiconductor memory element including a random access memory (RAM), a read only memory (ROM), a flash memory, etc. and/or a storage device including a hard disk, an optical disk, etc.

The control unit 320 includes an internal memory provided to store a control program, a program stipulating various processing procedures or the like, and appropriate data, and the deletion reason-registration unit 121, the communication processing unit 122, and a registration cancellation unit 323. Further, the control unit 320 is, for example, an integrated circuit including an application specific integrated circuit (ASIC), a field programmable gate array (FPGA), etc. and/or an electronic circuit including a central processing unit (CPU), a microprocessing unit (MPU), etc.

The registration cancellation unit 323 receives information about the cancellation of registered deletion flag information included in phone-book information, and cancels the registered deletion flag information included in the phone-book information. For example, when the registration cancellation unit 323 receives an incoming call from a communication destination registered with the phone-book deletion table data 112 as "estrangement" and a conversation is made through the key operation unit 101 operated by a user owning the terminal device 300, the registration cancellation unit 323 cancels the registered deletion flag information included in the phone-book table data 111. Further, the registration cancellation unit 323 deletes the appropriate memory number information included in the phone-book deletion table data 111. Further, when communications are interrupted, without having the conversation, through the key operation unit 101 operated by the user owning the terminal device 300, the registration cancellation unit 323 terminates the processing.

In short, when a conversation with a communication destination for which the deletion flag information is set for any reason is held, the terminal device 300 cancels the deletion flag information corresponding to the appropriate information included in the phone-book table data 111 and deletes the appropriate information included in the phone-book deletion table data 112.

(2) Electronic Mail

Further, in the above-described first, second, and third embodiments, the processing procedures that are performed during the conversation control through the terminal device and/or the phone-book management apparatus have been described. However, the processing procedures may also be performed during the transmission and/or the reception of an electronic mail.

For example, upon receiving an electronic mail transmitted from the communication destination corresponding to memory number information for which the deletion flag information is set, the terminal device permits and/or refuses the electronic mail based on settings, and/or performs control to display the name of the communication destination who had transmitted the electronic mail, the date and time of deletion, the deletion reason, etc. on the display unit.

(3) Updating Deletion Flag Through Phone-Book Management Apparatus

Further, according to the above-described second embodiment, the terminal device updates the deletion flag information and the deletion reason information when a specified condition relating to communications with a communication destination is satisfied. However, the phone-book management apparatus can also perform the same processing procedures.

For example, when a specified condition relating to communications established between the terminal device and a communication destination is satisfied, the phone-book management apparatus registers the deletion flag information and the deletion reason information with the phone-book information. For example, when the phone-book table data 161 includes information indicating that at least a specified time such as three months had elapsed from the date and time of the last conversation, where information about the date and time is registered with the phone-book table data 161, the phone-book management apparatus sets the deletion flag information "O" for the appropriate information of the phone-book table data 161, and registers the deletion reason information "estrangement" with the phone-book deletion table data 162.

Further, upon receiving information transmitted from the terminal device, the information indicating that a conversation is made at a specified volume level or more during communications established between the terminal device and the communication destination, the phone-book management apparatus sets the deletion flag information "O" for the appropriate information included in the phone-book table data 161 and registers the deletion reason information "quarrel" with the phone-book deletion table data 162.

Further, upon being triggered by a change in the company address-column data, the change being made due to the moving of the company of a user owning the terminal device, and/or a change in the personal information such as an electronic mail address, for example, the phone-book management apparatus sets the deletion flag information "O" for each of the information items corresponding to cooperation companies that are registered with the phone-book table data 161 as group data and registers the deletion reason information "moving of company and/or department" with the phone-book deletion table data 162.

(4) Configuration of Terminal Device

Further, the processing procedures, the control procedures, the specific names, and the information including various types of data, parameters, and so forth (e.g., the information included in the phone-book table data 111 and/or the phone-book deletion table data 112) that are illustrated in the above-described text and/or drawings may be arbitrarily changed unless otherwise noted. Further, the phone-book table data 111 and the phone-book deletion table data 112 may be stored as a single table data item.

The components of each of the illustrated devices are functionally and conceptually illustrated in the attached drawings, and may not be configured as physically as shown in the drawings. Namely, the specific form of distribution and/or integration of the devices is not limited to those shown in the drawings, and all or part of the devices may be distributed and/or integrated functionally and/or physically in an arbitrary unit based on various loads and/or service conditions. Further, all or arbitrary part of the processing functions performed in the devices may be achieved through a CPU and/or a program which is analyzed and executed through the CPU, or may be achieved as hardware attained based on wired logic.

(5) Configuration of Phone-Book Management Apparatus

Further, the processing procedures, the control procedures, the specific names, and the information including various types of data, parameters, and so forth (e.g., the information included in the phone-book table data 161 and/or the phone-book deletion table data 162) that are illustrated in the above-described text and/or drawings may be arbitrarily changed unless otherwise noted. Further, the phone-book table data 161 and the phone-book deletion table data 162 may be stored as a single table data item.

The components of each of the illustrated devices are functionally and conceptually illustrated in the attached drawings, and may not be configured as physically as shown in the drawings. Namely, the specific form of distribution and/or integration of the devices is not limited to those shown in the drawings, and all or part of the devices may be distributed and/or integrated functionally and/or physically in an arbitrary unit based on various loads and/or service conditions. Further, all or arbitrary part of the processing functions performed in the devices may be achieved through a CPU and/or a program which is analyzed and executed through the CPU, or may be achieved as hardware attained based on wired logic.

(6) Communication Processing Program Provided as Terminal Device

Figure 14:
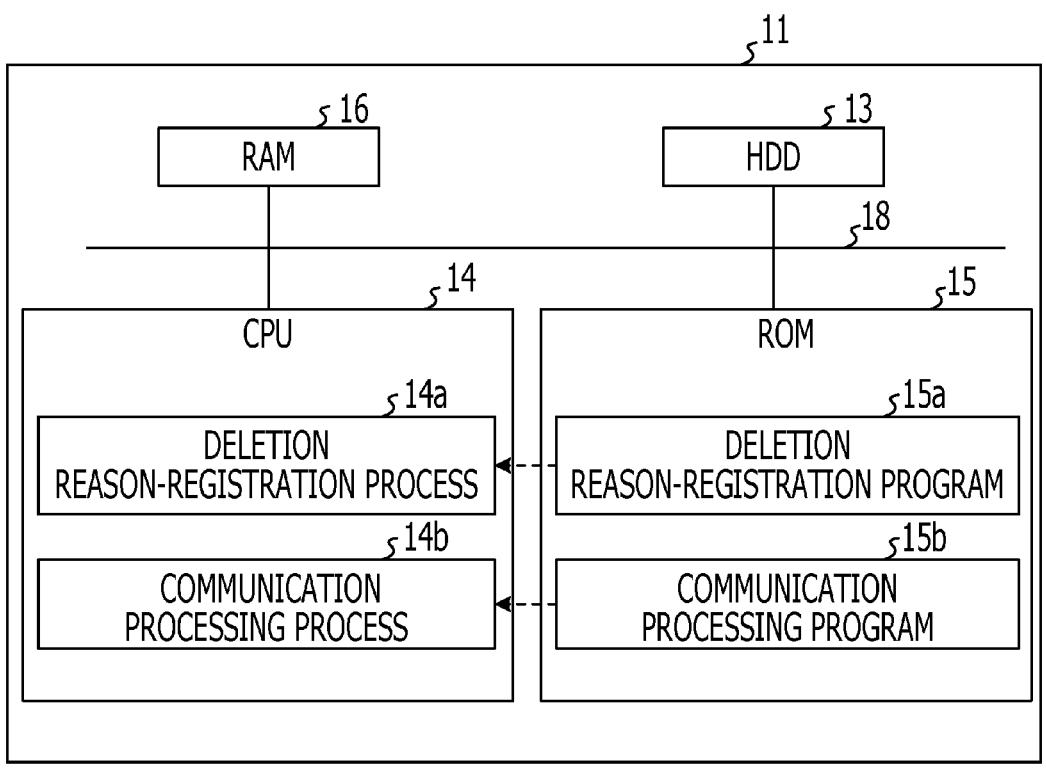
FIG. 14 illustrates a computer executing a communication processing program provided as a terminal device.

Incidentally, in the above-described embodiments, various processing procedures are attained based on hardware logic. However, the various processing procedures may be attained through a computer executing a specified program. Hereinafter, therefore, an exemplary computer executing a communication processing program having the same functions as those of the terminal device 100 illustrated in the above-described embodiments will be described with reference to FIG. 14. FIG. 14 illustrates a computer executing a communication processing program provided as a terminal device.

As illustrated in FIG. 14, a computer 11 provided as the terminal device 100 includes an HDD 13, a CPU 14, a ROM 15, a RAM 16, and so forth that are connected to one another via a bus 18.

Communication processing programs functioning in a manner similar to the terminal device 100 illustrated in the above-described embodiments, that is, a deletion reason-registration program 15*a* and a communication processing program 15*b* had already been stored in the ROM 15, as illustrated in FIG. 14. Those programs 15*a* and 15*b* may be integrated and/or distributed, as appropriate, as is the case with the components of the terminal device 100 illustrated in FIG. 1.

Then, the CPU 14 reads the programs 15*a* and 15*b* from the ROM 15 and executes the programs 15*a* and 15*b* so that the programs 15*a* and 15*b* function as a deletion reason registration process 14*a* and a communication processing process 14*b*, as illustrated in FIG. 14. Further, the processes 14*a* and 14*b* corresponds to the respective deletion reason-registration unit 121 and communication processing unit 122 that are illustrated in FIG. 1.

Then, the CPU 14 executes the communication processing program based on data stored in the RAM 16 (for example, the phone-book table data 11, the phone-book deletion table data 112, etc. that includes information relating to a communication destination).

The above-described programs 15*a* and 15*b* may not necessarily be stored in the ROM 15 from the first. Namely, for example, the programs 15*a* and 15*b* may be stored in a "movable physical medium" including a flexible disk (FD), a CD-ROM, a DVD, a magneto-optical disk, an IC card, etc., which is inserted into the computer 11, a "fixed physical medium" including an HDD or the like provided inside and/or outside the computer 11, a "different computer (and/or a server)" connected to the computer 11 via a public network, the Internet, a LAN, a WAN, etc., and so forth so that the computer 11 can read the programs 15a and 15b therefrom for execution.

Figure 15:
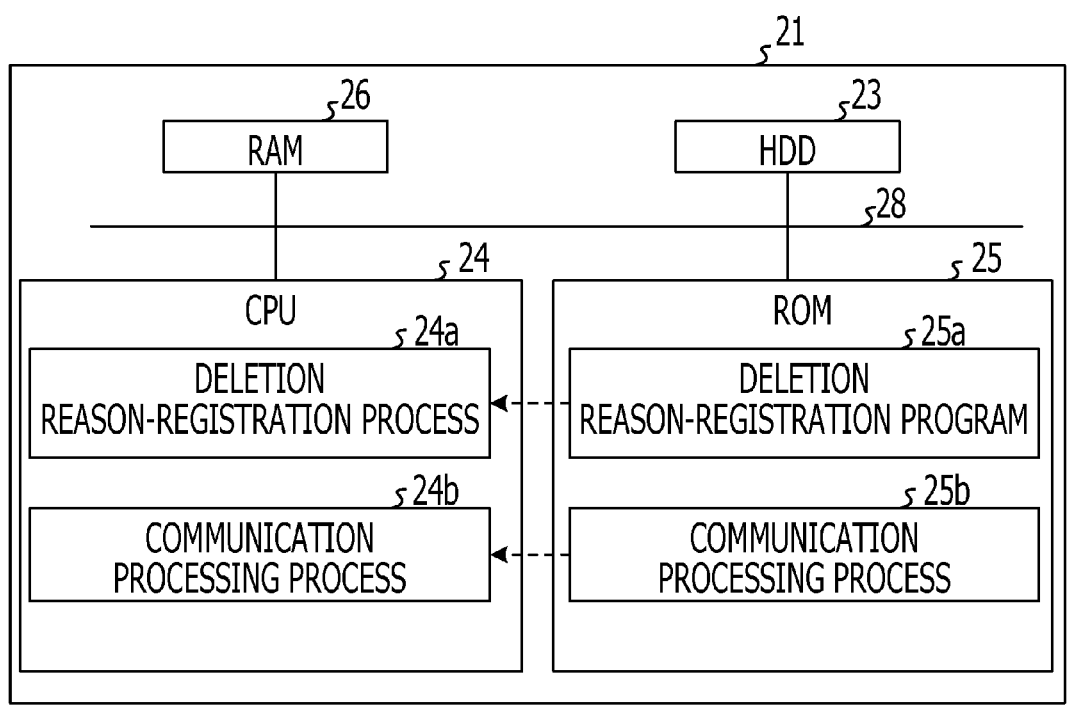
FIG. 15 illustrates a computer executing a communication processing program provided as a phone-book management apparatus.

(7) Communication Processing Program Provided as Phone-Book Management Apparatus Incidentally, in the above-described embodiments, various processing procedures are attained based on hardware logic. However, the various processing procedures may be attained through a computer executing a specified program. Hereinafter, therefore, an exemplary computer executing a communication processing program having the same functions as those of the phone-book management apparatus 150 illustrated in the above-described embodiments will be described with reference to FIG. 15. FIG. 15 illustrates a computer executing a communication processing program provided as a phone-book management apparatus.

As illustrated in FIG. 15, a computer 21 provided as the phone-book management apparatus 150 includes an HDD 23, a CPU 24, a ROM 25, a RAM 26, and so forth that are connected to one another via a bus 28.

Communication processing programs functioning in a manner similar to the phone-book management apparatus 150 illustrated in the above-described embodiments, that is, a deletion reason-registration program 25a and a communication processing program 25b had already been stored in the ROM 25, as illustrated in FIG. 15. Those programs 25a and 25b may be integrated and/or distributed, as appropriate, as is the case with the components of the phone-book management apparatus 150 illustrated in FIG. 10.

Then, the CPU 24 reads the programs 25a and 25b from the ROM 25 and executes the programs 25a and 25b so that the programs 25a and 25b function as a deletion reason registration process 24a and a communication processing process 24b, as illustrated in FIG. 15. Further, the processes 24a and 24b correspond to the respective deletion reason-registration unit 171 and communication processing unit 172 that are illustrated in FIG. 10.

Then, the CPU 24 executes the communication processing program based on data stored in the RAM 26 (for example, the phone-book table data 161, the phone-book deletion table data 162, etc. that include information relating to a communication destination of the terminal device).

The above-described programs 25a and 25b may not necessarily be stored in the ROM 25 from the first. Namely, for example, the programs 25a and 25b may be stored in a "movable physical medium" including a flexible disk (FD), a CD-ROM, a DVD, a magneto-optical disk, an IC card, etc., which is inserted into the computer 21, a "fixed physical medium" including an HDD provided inside and/or outside the computer 21, a "different computer (and/or a server)" connected to the computer 21 via a public network, the Internet, a LAN, a WAN, etc., and so forth so that the computer 21 can read the programs 25a and 25b therefrom for execution.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A terminal device comprising:
a deletion reason registration unit, and
a storage unit, wherein
said deletion reason registration unit registers deletion target information and deletion reason information with said storage unit, wherein
said storage unit stores information relating to a communication destination;
said terminal device further comprising:
a communication processing unit which acquires the deletion reason information from the storage unit upon receiving information about a communication connection request,
said communication connection request being issued from a device of a communication destination corresponding to the deletion target information,
wherein said communication processing unit executes communication processing based on the acquired deletion reason information,
wherein the deletion reason registration unit receives deletion reason information and information indicating that data registered with the storage unit is to be deleted, and
wherein the deletion reason registration unit registers the deletion target information and the deletion reason information with the storage unit.

2. The terminal device according to claim 1, wherein the deletion reason registration unit registers the deletion target information and the deletion reason information with the storage unit, when a specified condition relating to communications with the device of the communication destination is satisfied.

3. The terminal device according to claim 1, wherein the communication processing unit acquires the deletion reason information registered by the deletion reason-registration unit from the storage unit, and controls display information including the acquired deletion reason information on a display unit.

4. A communication processing method executed by a computer,
wherein the computer:
registers deletion target information and deletion reason information with a storage unit, wherein said storage unit stores information relating to a communication destination;
acquires the deletion reason information from the storage unit upon receiving information about a communication connection request issued from a device of a communication destination corresponding to the deletion target information stored in the storage unit,
executes communication processing based on the acquired deletion reason information,
receives deletion reason information and information indicating that information registered with the storage unit is to be deleted; and
registers the deletion target information and the deletion reason information with the storage unit.

5. A phone-book management method executed by a computer, wherein the computer:
registers deletion target information and deletion reason information with a storage unit, wherein said storage unit stores information relating to a communication destination of a terminal device which is communicable via a network; and acquires the deletion reason information from the storage unit upon receiving information about a communication connection request issued from a device of a communication destination of the terminal device corresponding to the deletion target information stored in the storage unit, and executes communication processing based on the acquired deletion reason information, receives deletion reason information and information indicating that information registered with the storage unit is to be deleted; and registers the deletion target information and the deletion reason information with the storage unit.

6. The phone-book management method according to claim 5, wherein the computer:

registers the deletion target information and the deletion reason information with the storage unit when a specified condition relating to communications with the device of the communication destination of the terminal device is satisfied.

7. The phone-book management method according to claim 5, wherein the computer:

acquires the deletion reason information registered from the storage unit, and notifies the terminal device of information including the acquired deletion reason information.

* * * * *